3,793,350
PROCESS FOR PREPARING 17α,21-DIHYDROXY-20-KETO-PREGNANES, DERIVATIVES AND INTERMEDIATES THEREOF

Pierre Crabbé, Mexico City, Mexico, assignor to Syntex Corporation, Panama, Panama
No Drawing. Filed Oct. 1, 1971, Ser. No. 185,911
Int. Cl. C07c 169/20, 169/32
U.S. Cl. 260—397.45                    20 Claims

ABSTRACT OF THE DISCLOSURE

New process for preparing 17α,21 - dihydroxy-20-keto steroids of the pregnane series, useful as anti-inflammatory agents, starting from 17-(2′α-acyloxyvinylidene) androstane compounds, and the novel 17α,21-diacyloxy-20-keto-pregnanes and 21,21-diacyloxy-17α-hydroxy-20-keto-pregnanes obtained as intermediates in this process.

---

The present invention relates to a new process for the preparation of certain cyclopentanophenanthrene derivatives and to certain novel compounds obtained as intermediates.

More particularly, the present invention relates to a process for the conversion of 17-(2′α-acyloxyvinylidene) androstane and estrane derivatives into compounds having the 17α,21-dihydroxy-20-keto moiety, i.e. to a process for the elaboration of the corticoid side chain. In addition, the present invention relates to certain novel compounds obtained as intermediates in this process, namely to 17α,21-diacyloxy and 21,21-diacyloxy-17α-hydroxy-20-keto compounds (acetals of 21-aldehydopregnanes), as well as the corresponding 19-nor compounds thereof.

Steroid compounds which bear the 17α,21-dihydroxy-20-keto system, commonly referred to as the dihydroxy acetone side chain, demonstrate important and potent biological activities, thus they are potent anti-inflammatory agents, useful in the treatment of arthritis, allergic demmatitis, contact dermatitis, and like conditions. Examples of compounds in this series of steriod which possess and have been used in accordance with such activity are betamethasone, cortisone, dexamethasone, hydrocortisone, methylprednisolone, paramethasone, prednisolone, prednisone, and triamcinolone. Many other steroids having the 17α,21-dihydroxy-20-keto system which exhibit corticoidal activity are known and have been described repeatedly, for example, in Steroid Drugs by Norman Applezweig, vol. 1, McGraw-Hill Book Co., Inc., 1962, and vol. 2, Holden Day, Inc., 1964.

The process object of the present invention can be illustrated by the following sequence of reactions, wherein for the sake of simplicity only ring D of the steroid molecule is presented:

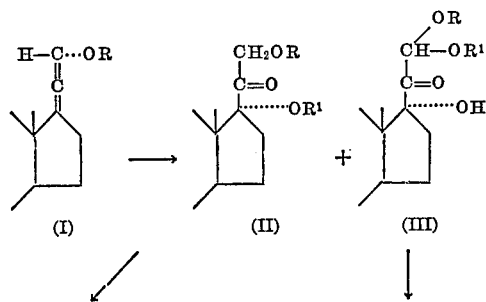

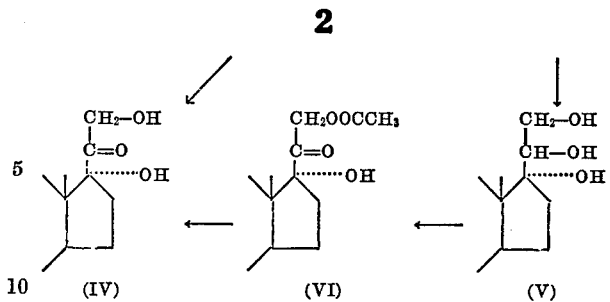

wherein R is a lower acyl group of 1 to 4 carbon atoms, particularly the acetyl group, and $R^1$ is an acyl group derived from a percarboxylic acid, as defined infra, particularly the m-chlorobenzoyl group.

In practicing the process outlined above, a 17-(2′α-aclyoxyvinylidene) androstane or estrane derivative (I) is treated in an inert solvent with 2 to 4 molar equivalents of a percarboxylic acid and 2 to 4 molar equivalents of its corresponding carboxylic acid, at a pH of about 7 or greater than 7, such as is produced by an alkaline buffer such as disodium hydrogen phosphate or sodium bicarbonate to yield a mixture of the 17α-acyloxy-21-acyloxy-20-keto pregnane (II) and the 17α-hydroxy-21-acetal-20-keto pregnane (III), namely 21-acyloxy-21-acyloxy-20-keto-pregnane. This reaction is conducted at a temperature comprised between about 0° C. to about 60° C. for a period of time of the order of 4 hours to several days, depending upon the temperature used. In the preferred embodiments the reaction is effected at room temperature, for a period of time of the order of 72 to 120 hours, preferably for about 90 hours. Suitable solvents for this reaction are the halogenated hydrocarbons such as chloroform, methylene chloride, carbon tetrachloride and the like.

In the first stage of this reaction there is formed a mixture of the 17α,20α-monoepoxide and the 17,20; 20,21-bis-epoxide which are cleaved by the attack of the acid ion, to yield respectively compounds (II) and (III).

The products are separated and isolated from the reaction mixture by conventional techniques, which involve dilution with water, extraction, evaporation of the solvents and separation of the products by chromatography or fractional crystallization.

When the above reaction is conducted at a pH of less than about 7 such as is produced by an absence of the alkaline buffer or in the presence of an acid buffer, e.g. in the presence of monopotassium phthalate, there is produced exclusively the 21-acetal (III).

Suitable percarboxylic acids useful for the purposes hereof include peracetic acid, perbenzoic, m-chloroperbenzoic, perphthalic, persuccinic, pertrifluoroacetic, performic, and the like. Particularly preferred are peracetic, perbenzoic, and m-chloroperbenzoic acid. Depending upon the choice of percarboxylic acid, the corresponding acyloxy group is incorporated into the molecule at positions C–17α or C–21. Thus, in those instances wherein a 17-(2′α-acetoxyvinylidene) (I) compound is treated with peracetic acid, as above described, the 17α,21-diacetoxy (II) and 17α-hydroxy-21,21-diacetoxy (III) compounds are prepared. Likewise, by employing m-chloroperbenzoic acid with the same starting compound, the 171α-m-chlorobenzoyloxy-21-acetoxy and 17α-hydroxy-21-acetoxy-21-m-chlorobenzoyloxy compounds are prepared.

It will be appreciated that, depending upon the choice of peracid, the amount of buffer and corresponding carboxylic acid employed is variable to provide a pH within the limits set forth. Generally, these amounts are readily determinable within the skill of the art.

Upon alkaline hydrolysis of compound (II) there is produced the 17α,21-dihydroxy-20-keto pregnane derivative (IV). This reaction is preferably carried out by using a dilute solution of an alkaline bicarbonate in a lower aliphatic alcohol such as methanol or ethanol at reflux temperature for a short period of time, i.e. for approximately 15 to 30 minutes, however, any other methods known in the steroid art for the hydrolysis of the corticoid side chain can also be used, e.g. by employing an alkali metal hydroxide or an alkali metal alkoxide.

By reaction of compound (III) with a double metal hydride such as sodium borohydride or lithium borohydride there is produced the 17α,20,21-triol (V), which is then selectively acetylated at C–21 using about 1 molar equivalent of acetic anhydride in pyridine solution. This selective acetylation is conducted at approximately 0° C. for 16 to 24 hours and the 21-acetoxy-17α20-dihydroxy compound is in turn oxidized with chromium trioxide in aqueous acetic acid or acetone-sulfuric acid solution (Jones reagent) to yield the 21 - acetoxy - 17α-hydroxy-20-keto-pregnane (VI). Conventional alkaline hydrolysis of this monoester gives the 17α,21-dihydroxy-20-keto compound (IV).

The process of the present invention can be used with simple 17-(2'α-acyloxyvinylidene) starting compounds to prepare simple 17α,21-dihydroxy-20-keto-pregnanes and 19-nor-pregnanes which can be elaborated further, or alternatively the starting materials may possess different substituents. Thus the process can be practiced upon 3-keto-17-(2'α-acyloxyvinylidene)-androst-4-enes or estr-4-enes or upon saturated 3β-hydroxy or acyloxy compounds. The Δ⁴-3-keto starting materials may be additionally substituted at one or several positions of the steroid molecule, particularly by methyl groups at C–6 and/or C–16, halogen atoms (chloro, bromo or fluoro) at C–6 and/or C–9, hydroxy or keto groups at C–11 and methylene or halomethylene groups at C–1,2 and/or C–6,7.

The 17-(2'α-acyloxyvinylidene) starting compounds are obtained by reaction of the corresponding 17β-acyloxy-17α-ethynyl androstane or estrane derivatives with a silver salt such as silver perchlorate in a suitable organic solvent in which both the silver salt and the steroid are soluble, e.g. acetone and in the presence of an organic base, in accordance with the method of W. R. Benn,, J.O.C., 33, p. 3113 (1968) and U.S. Pat. 3,484,463 or with a copper salt in diglyme solution, to yield a mixture of cis and trans acetoxyallene compounds, which can be separated by fractional crystallization or chromatography.

The 17β-acyloxy-17α-ethynylandrostane or estrane derivatives are known compounds or can be prepared by conventional methods, by ethynylation of the 17-keto steroids with an alkali metal acetylide or with acetylene in the presence of an alkali metal alkoxide in dimethyl sulfoxide (see for example U.S. Pats. 3,126,376 and 3,470,217). The 17α-ethynyl-17β-hydroxy compounds thus obtained are conventionally esterified with a mixture of a carboxylic acid-carboxylic anhydride in the presence of an acid catalyst or with a carboxylic anhydride in benzene solution and in the presence of p-toluenesulfonic acid. Such compounds are described, inter alia, in U.S. Pat. Nos. 2,838,549, 2,964,537, 3,028,401, 3,047,592, 3,080,391, 3,084,173, 3,178,412, 3,270,037, 3,338,928, 3,409,643, 3,414,592, 3,444,295, and 3,462,465.

The process of the present invention is particularly useful for the preparation of fundamental corticoid compounds which exhibit anti-inflammatory activity but, more importantly, which are also very suitable as nuclei which can be further elaborated, in accordance with known and standard methods, to prepare valuable anti-inflammatory agents known in the steroid art. For example, the process hereof is notably suited for the preparation of such basic compounds as 17α,21-dihydroxy-pregn-4-en-3,20-dione, hydrocortisone and cortisone.

In the preferred embodiments hereof, the present invention is useful for the preparation of 17α,21-dihydroxy-20-keto compounds having the following formula:

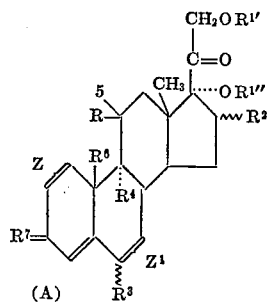

(A)

and the 4,5-dihydro derivatives thereof; wherein each of

R¹' and R¹''' is hydrogen or a conventionally hydrolyzable ester or ether;

R² is hydrogen, lower alkyl, halogenated methyl, hydroxy or a conventional hydrolyzable ester or ether thereof; or R¹''' and R² together are a ketal or acetal group;

R³ is hydrogen, fluoro, chloro, bromo or methyl;

R⁴ is hydrogen, fluoro, chloro or bromo, provided that R⁴ is chloro when R⁸ is chloro, and is hydrogen when R⁸ is hydrogen;

R⁵ is oxo or the group

wherein R⁸ is hydrogen hydroxy or chloro;

R⁶ is hydrogen or methyl;

R⁷ is oxo or the group

wherein R⁹ is hydroxy or a conventional hydrolyzable ester or ether thereof; and each of Z and Z¹ is a carbon-carbon single bond, a carbon-carbon double bond, or the group

in which each of X and Y is hydrogen, chloro, or fluoro; provided that when R⁶ is hydrogen, Z is a single bond.

As indicated above, these compounds can be prepared directly from the corresponding 17 - (2'α - acyloxyvinylidene) compounds, by following the process of the present invention, or they are obtainable, in the preferred embodiments, upon further elaboration of a basic pregnane product, in accordance with methods well known in the steroid art. Thus, the 3-acyloxy compounds can be hydrolyzed and the 3-hydroxyl oxidized to the ketone and if desired the Δ⁴-unsaturation can be introduced by conventional procedures. The Δ⁴-3-keto compounds can be further elaborated as respect the introduction of halogen atoms at C–6, C–9 and /or C–11, Δ¹ and/or Δ⁶ unsaturation, microbiological hydroxylation at C–11 and/or C–16, 16,17-acetonide formation, esterification or etherification, etc. to prepare such useful compounds as flumethasone, prednisolone, prednisone, fluocinolone, acetonide, and the like.

It will be obvious to the skilled in the art that substituents other than those mentioned above can be present in the starting material or introduced after practicing the process object of the present invention. The specific choice of starting material and the further elaboration is within the ordinary level of the skilled in the steroid art in accordance with the present disclosure.

The novel 21,21-diacyloxy-17α-hydroxy compounds, useful as intermediate steroids of the present invention, are represented by the following formulas:

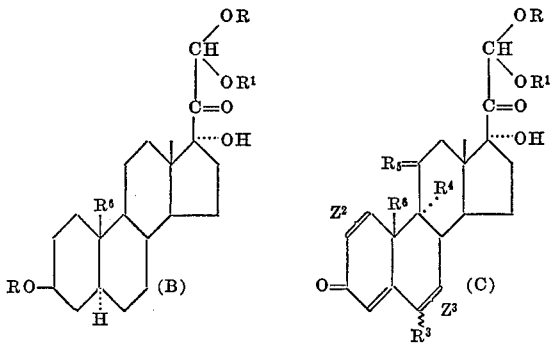

wherein A, $R^1$, $R^3$, $R^4$, $R^5$, and $R^6$ are as defined above and each of $Z^2$ and $Z^3$ is a carbon-carbon single bond or the group

in which each of X and Y is hydrogen, fluoro or chloro.

In the present specification and claims, the following definitions apply:

The wavy line (∼) used in the depicted formulas indicates that the substituents attached to those positions can be either in the configuration alpha (α) or beta (β) or mixtures thereof.

The term "conventional hydrolyzable ester" denotes those hydrolyzable ester groups conventionally employed in the steroid art, derived from carboxylic acids which include both substituted and unsubstituted carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted for functional groups, for example, hydroxy, alkoxy containing up to 6 carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, valerate, caproate, enanthate, caprylate, pelaronate, acrylate, undecenoate, phenoxyacetate, benzoate, phenylacetate, diphenylacetate, diethylacetate, trimethylacetate, t-butylacetate, trimethylhexanoate, methylneopenthylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloroacetate, β-chloropropionate, trichloroacetate, β-chlorobutyrate, bicyclo-[2.2.2]-octane-1-carboxylate, 4-methylbutylo-[2.2.2]-oct.-2-ene-1-carboxylate and the like. The preferred conventional esters are derived from hydrocarbon carboxylic acids, e. g. acetate.

"Conventional hydrolyzable ethers" include the cyclopentyl, tetrahydrofuran-2'-yl, tetrahydropyran-2'-yl, and 4'-methoxytetrahydropyran-4'-yl ethers.

The term "lower alkyl" defines aliphatic hydrocarbons of from 1 to 6 carbon atoms including all isomers thereof. Typical lower alkyl groups are methyl, ethyl, isopropyl, t-butyl, isoamyl and n-hexyl.

The term "halogenated methyl" defines a methyl group substituted with 1, 2 or 3 halogen atoms, preferably chloro and fluoro. Typical halogenated methyl groups include fluoromethyl, chloromethyl, difluoromethyl, chlorofluoromethyl, trichloromethyl, trifluoromethyl and the like.

The terms "acyl" or "acyloxy" define acyl and acyloxy groups derived from lower alkanoic acids containing from 2 to 4 carbon atoms, that is, acetic, propionic, and the butyric acids, and from percarboxylic acids, as appropriate, as defined above.

The following examples typify the manner by which the present invention can be practiced and represent, in one aspect, the best mode for carrying out the invention. As such, they should be construed merely as illustrative and not as limitative upon the overall scope hereof.

PREPARATION 1

A slow stream of purified acetylene is passed through a stirred suspension of 25 g. of lithium acetylide in 100 ml. of dimethylsulfoxide for 30 minutes; 50 ml. of anhydrous tetrahydrofuran are added and the stream of acetylene is resumed for 30 minutes further. A solution of 25 g. of 3β-hydroxy-5α-androstan-17-one in 300 ml. of anhydrous tetrahydrofuran are then added, and acetylene is bubbled through the solution for an additional 30 minute period. The reaction mixture is maintained at room temperature fo 20 hours, it is then diluted with 2 N hydrochloric acid solution until pH 2, and then with ice-water. The formed precipitate is collected by filtration, washed with water and air dried, to yield 17α-ethynyl-5α-androstane-3β,17β-diol, which can be purified by recrystallization from acetone-ether.

A mixture of 20 g. of 17α-ethynyl-5α-androstane-3β,17β-diol, 40 ml. of acetic acid, 100 ml. of acetic anhydride and 2 g. of p-toluenesulfonic acid is stirred for 2 hours at room temperature, poured into ice-water and the resulting mixture stirred to effect hydrolysis of the excess anhydride. The formed precipitate is collected by filtration, washed with water and air dried, to produce 3β,17β-diacetoxy-17α-ethynyl-5α-androstane.

In like manner, by following the esterification procedure in the immediately foregoing paragraph, but substituting propionic anhydride and butyric anhydride, for acetic anhydride there are obtained the corresponding 3,17-dipropionates and dibutyrates of 17α-ethynyl-5α-androstane-3β,17β-diol. By the same method, the corresponding esters of 17α-ethynyl-5α-estrane-3β,17β-diol are obtained.

Likewise, the foregoing processes can be used to prepare the following representative compounds:

6α-methyl-17α-ethynyl-17β-acetoxyestr-4-en-3-one,
6α-chloro-17α-ethynyl-17β-acetoxyandrost-4-en-3-one,
6α-chloro-17α-ethynyl-17β-acetoxyestr-4-en-3-one,
6α-fluoro-17α-ethynyl-17β-acetoxyandrost-4-en-3-one,
6β-fluoro-17α-ethynyl-17β-acetoxyandrost-4-en-3-one,
6α-fluoro-17α-ethynyl-17β-acetoxyestr-4-en-3-one,
6α,7α-difluoromethylene-17α-ethynyl-17β-acetoxyandrost-4-en-3-one,
6α,7α-methylene-17α-ethynyl-17β-acetoxyandrost-4-en-3-one,
6α,7α-difluoromethylene-17α-ethynyl-17β-acetoxyestr-4-en-3-one,
6α,7α-methylene-17α-ethynyl-17β-acetoxyestr-4-en-3-one,
1α,2α-difluoromethylene-17α-ethynyl-17β-acetoxyandrost-4-en-3-one,
1α,2α-methylene-6α,7α-difluoromethylene-17α-ethynyl-17β-acetoxyestr-4-en-3-one,
9α-fluoro-17α-ethynyl-17β-acetoxyandrost-4-ene-3,11-dione,
6α-fluoro-17α-ethynyl-17β-acetoxyandrost-4-en-11β-ol-3-one,
17α-ethynyl-17β-acetoxyandrost-4-ene-3,11-dione, and
17α-ethynyl-17β-acetoxyandrost-4-en-11β-ol-3-one.

PREPARATION 2

To a solution of 5 g. of 3β,17β-diacetoxy-17α-ethynyl-5α-androstane in 50 ml. of anhydrous diglyme is added 4.2 g. of cuprous iodide and the reaction mixture is refluxed under nitrogen atmosphere for 30 minutes. The reaction mixture is then cooled and filtered through Florisil. The filtrate is evaporated to dryness and chromatographed on Florisil. The fractions eluted with hexane-ether (95:5) give 3β-acetoxy-17-(2'-acetoxyvinylidene)-5α-androstane and a small amount of the 17-(2'β-acetoxyvinylidene) isomer.

PREPARATION 3

A mixture of 10 g. of 3β,17β-diacetoxy-17α-ethynyl-5α-androstane, 0.35 g. of silver perchlorate, 0.4 g. of tetramethylguanidine and 115 ml. of acetone is refluxed under nitrogen atmosphere for 72 hours. The reaction mixture is cooled, 150 ml. of saturated aqueous ammonium chloride solution is added and the mixture is stirred at room temperature for 15 minutes. The precipitated silver salts are filtered off and the filtrate is evaporated to dryness under reduced pressure. The residue is crystallized from methanol, to yield 3β-acetoxy-17-(2'α-acetoxyvinylidene)-5α-androstane, identical with the product obtained in preparation 1.

In like manner, starting from the corresponding 17α-ethynyl-17β-acyloxy compounds there are prepared:

3β-acetoxy-17-(2'α-acetoxyvinylidene)-5α-estrane,
3β-propionoxy-17-(2'α-propionoxyvinylidene)-5α-androstane,
3β-butyriloxy-17-(2'α-butyriloxyvinylidene)-5α-estrane,
17-(2'α-acetoxyvinylidene)androst-4-en-3-one,
17-(2'α-acetoxyvinylidene)estr-4-en-3-one,
6α-methyl-17-(2'α-acetoxyvinylidene)androst-4-en-3-one,
6α-methyl-17-(2'α-acetoxyvinylidene)estr-4-en-3-one,
6α-chloro-17-(2'α-acetoxyvinylidene)androst-4-en-3-one,
6α-chloro-17-(2'α-acetoxyvinylidene)estr-4-en-3-one,
6α-fluoro-17-(2'α-acetoxyvinylidene)androst-4-en-3-one,
6α-fluoro-17-(2'α-acetoxyvinylidene)estr-4-en-3-one,
6β-fluoro-17-(2'α-acetoxyvinlidene)androst-4-en-3-one,
6α,7α-difluoromethylene-17-(2'α-acetoxyvinylidene)androst-4-en-3-one,
6α,7α-methylene-17-(2'α-acetoxyvinylidene)androst-4-en-3-one,
6α,7α-difluoromethylene-17-(2'α-acetoxyvinylidene)estr-4-en-3-one,
6α,7α-methylene-17-(2'α-acetoxyvinylidene)estr-4-en-3-one,
1α,2α-difluoromethylene-17-(2'α-acetoxyvinylidene)androst-4-en-3-one,
1α,2α-difluoromethylene-17-(2'α-acetoxyvinylidene)estr-4-en-3-one,
9α-fluoro-17-(2'α-acetoxyvinylidene)androst-4-en-3,11-dione,
6α-fluoro-17-(2'α-acetoxyvinylidene)androst-4-en-11β-ol-3-one,
17-(2'α-acetoxyvinylidene)androst-4-ene-3,11-dione, and
17-(2'α-acetoxyvinylidene)androst-4-en-11β-ol-3-one and small amounts of the corresponding 17-(2'β-acyloxyvinylidene) isomers.

EXAMPLE 1

A solution of 1 g. of 3β-acetoxy-17-(2'α-acetoxyvinylidene)-5α-androstane in 75 ml. of chloroform is treated with 1 g. of m-chlorobenzoic acid, 1.12 g. of m-chloroperbenzoic acid and 1 g. of disodium hydrogen phosphate and the reaction mixture is allowed to stand at room temperature for 72 hours. Eight hundred milligrams of m-chloroperbenzoic acid are then added and the reaction mixture is kept for 24 hours further under the same conditions. The reaction mixture is then diluted with water, the organic layer is separated and the aqueous phase is extracted several times with chloroform. The combined organic extracts are washed with sodium bicarbonate solution and water to neutral, dried over sodium sulfate and evaporated to dryness under reduced pressure. The residue is purified by tlc on a silica plate, using hexane-ethyl acetate (98:2) as eluant, to yield 385 mg. of 3β,21-diacetoxy-17α-m-chlorobenzoyloxy-5α-pregnan-20-one and 337 mg. of 3β,21-diacetoxy-21-m-chlorobenzoyloxy-17α-hydroxy-5α-pregnan-20-one. Both compounds can be further purified by recrystallization from methanol.

In like manner, 3β,21-diacetoxy-17α-benzoyloxy-5α-pregnan-20-one and 3β,21-diacetoxy-221-benzoyloxy-17α-hydroxy-5α-pregnan-20-one are prepared using benzoic acid and perbenzoic acid and 3β,17α,21-triacetoxy-5α-pregnan-20-one and 3β,21,21-triacetoxy-17α-hydroxy-5α-pregnan-20-one are prepared using acetic acid and peracetic acid.

EXAMPLE 2

To a solution of 100 mg. of 3β,21-diacetoxy-17α-m-chlorobenzoyloxy-5α-pregnan-20-one in 25 ml. of methanol is added 3 ml. of a 5% aqueous potassium bicarbonate solution, and the mixture is refluxed for 15 minutes under nitrogen atmosphere. It is then cooled, diluted with water and extracted with ethyl acetate, the organic extract is washed with water to neutral, dried over sodium sulfate and evaporated to dryness under vacuo. Crystallization of the residue from methanol affords 60 mg. of the pure 5α-pregnane-3β,17α,21-triol-20-one, identical with the authentic sample.

Similarly, the 17α-benzoyloxy and 17α-acetoxy products of the foregoing procedure are converted to the corresponding 3β,17α,21-triol-20-one compound.

EXAMPLE 3

A solution of 200 mg. of 3β-acetoxy-17-(2'α-acetoxyvinylidene)-5α-androstane in 10 ml. of chloroform is treated with 5 ml. of aqueous monopotassium phthalate 0.05 M and 175 mg. of m-chloroperbenzoic acid and the mixture is kept at room temperature under stirring for 48 hours. It is then poured into water and extracted with chloroform. The organic extracts are washed with sodium bicarbonate solution and water to neutral, dried over sodium sulfate and evaporated to dryness under reduced pressure. The residue is purified by tlc to produce 140 mg. of 3β,21-diacetoxy-21-m-chlorobenzoxyloxy-17α-hydroxy-5α-pregnan-29-one, identical to that obtained in Example 1.

The same results are obtained when the reaction is conducted in the presence of 200 mg. of m-chlorobenzoic acid.

Similarly, 3β,21-diacetoxy-21-benzoyloxy-17α-hydroxy-5α-pregnan-20-one and 3β,21,21-triacetoxy-17α-hydroxy-5α-pregnan-20-one are prepared using the respective percarboxylic acids and corresponding carboxylic acid.

EXAMPLE 4

A mixture of 50 ml. of methylene chloride, 860 mg. of m-chloroperbenzoic acid, 1 g. of m-chlorobenzoic acid and 1 g. of disodium hydrogen phosphate is stirred for 10 minutes at room temperature, and then 1 g. of 3β-acetoxy-17-(2'α-acetoxyvinylidene)-5α-androstane is added. The reaction mixture is stirred for 90 hours, 215 mg. of m-chloroperbenzoic acid are added and the reaction mixture stirred for 24 hours further. It is diluted with water, the organic phase is separated and the aqueous phase extracted with chloroform. The combined organic extracts are washed with water to neutral, dried over sodium sulfate and evaporated to dryness. The residue is purified by TLC to yield 3β,21-diacetoxy-17α-m-chlorobenzoyloxy-5α-pregnan-20-one and 3β,21-diacetoxy-21-m-chlorobenzoyloxy-5α-pregnan-20-one in similar yields to those obtained in Example 1.

Similarly, 3β,21-diacetoxy-17α-benzoyloxy-5α-pregnan-20-one and 3β,21-diacetoxy-21-benzoyloxy-5α-pregnan-20-one are prepared using benzoic acid and perbenzoic acid and 3β,17α,21-triacetoxy-5α-pregnan-20-one and 3β,21,21-triacetoxy-17α-hydroxy-5α-pregnan-20-one are prepared using acetic acid and peracetic acid.

EXAMPLE 5

A solution of 800 mg. of 3β,21-diacetoxy-21-m-chlorobenzoyloxy-5α-pregnan-17α-ol-20-one in 30 ml. of methanol and 30 ml. of tetrahydrofuran is treated with a solution of 400 mg. of sodium borohydride in 10 ml. of water and the reaction mixture is kept at room temperature for 24 hours. A few drops of acetic acid are then added and the mixture is concentrated under vacuo to a small volume. It is then diluted with water and the formed precipitate collected by filtration, washed with water and dried, thus affording 5α-pregnane-3β,17α,20,21-tetrol, which can be purified by crystallization from acetone-hexane.

A mixture of 500 mg. of 5α-pregnane-3β,17α,20,21-tetrol, 2 ml. of pyridine and 1.1 molar equivalents of acetic anhydride is kept at 0° C. for 16 hours; it is then diluted with water and extracted with methylene chloride. The organic extract is washed to neutral, dried over sodium sulfate and evaporated to dryness under reduced pressure. The residue is purified by TLC to yield the pure 21-acetoxy-5α-pregnane-3β,17α,20-triol.

A solution of 100 mg. of 2-acetoxy-5α-pregnane-3β, 17α,20-triol in 10 ml. of acetone is cooled to 10° C. and treated under an atmosphere of nitrogen and with stirring, with an 8 N solution of chromic acid (prepared by mixing 26 g. of chromium trioxide with 23 ml. of concentrated sulfuric acid and diluting with water to 100 ml.), until the color of the reagent persisted in the mixture. It is stirred for 10 minutes further at the same temperature and diluted with sodium bisulfite solution and water. The product is then extracted with methylene chloride and the organic extract washed with water, dried over sodium sulfate and evaporated under vacuum, thus affording a crude product which upon recrystallization from acetone-hexane gives 21 - acetoxy-5α-pregnan-17α-ol-3,20-dione, identical to an authentic sample.

A solution of 1 g. of 21-acetoxy-5α-pregnan-17α-ol-3,20-dione in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 5α-pregnane-17α,21-diol-3,20-dione which is recrystallized from methylene chloride:ether.

EXAMPLE 6

In accordance with the methods of Example 1 or 4, the following 17α-m-chlorobenzoyloxy-21-acyloxy- and 17α-hydroxy - 21 - acyloxy - 21 - m-chlorobenzoyloxy-20-ketopregnane derivatives are prepared, starting from the corresponding 17-(2'α-acyloxyvinylidene) steroids obtained as described in preparation 3:

3β,21-diacetoxy-17α-m-chlorobenzoyloxy-19-nor-5α-pregnan-20-one, and
3β,21-diacetoxy-21-m-chlorobenzoyloxy-19-nor-5α-pregnan-17α-ol-20-one;
3β,21-dipropionoxy-17α-m-chlorobenzoyloxy-5α-pregnan-20-one, and
3β,21-dipropionoxy-21-m-chlorobenzoyloxy-5α-pregnan-17-ol-20-one;
3β,21-dibutyryloxy-17α-m-chlorobenzoyloxy-19-nor-5α-pregnan-20-one, and
3β,21-dibutyryloxy-21-m-chlorobenzoyloxy-19-nor-5α-pregnan-17α-ol-20-one;
17α-m-chlorobenzoyloxy-21-acetoxypregn-4-ene-3,20-dione, and
21-m-chlorobenzoyloxy-21-acetoxy-17α-hydroxypregn-4-ene-3,20-dione;
17α-m-chlorobenzoyloxy-21-acetoxy-19-norpregn-4-ene-3,20-dione, and
21-m-chlorobenzoyloxy-21-acetoxy-19-norpregn-4-17α-ol-3,20-dione;
6α-methyl-17α-m-chlorobenzoyloxy-21-acetoxypregn-4-ene-3,20-dione, and
6α-methyl-21-m-chlorobenzoyloxy-21-acetoxy-17α-hydroxypregn-4-ene-3,20-dione;
6α-methyl-17α-m-chlorobenzoyloxy-21-acetoxy-19-norpregn-4-ene-3,20-dione, and
6α-methyl-21-m-chlorobenzoyloxy-21-acetoxy-19-norpregn-4-en-17α-ol-3,20-dione;
6α-chloro-17α-m-chlorobenzoyloxy-21-acetoxypregn-4-ene-3,20-dione, and
6α-chloro-21-m-chlorobenzoyloxy-21-acetoxy-17α-hydroxypregn-4-ene-3,20-dione;
6α-chloro-17α-m-chlorobenzoyloxy-21-acetoxy-19-norpregn-4-ene-3,20-dione, and
6α-chloro-21-m-chlorobenzoyloxy-21-acetoxy-19-norpregn-4-en-17α-ol-3,20-dione;
6α-fluoro-17α-m-chlorobenzoyloxy-21-acetoxypregn-4-ene-3,20-dione, and
6α-fluoro-21-m-chlorobenzoyloxy-21-acetoxy-17α-hydroxypregn-4-ene-3,20-dione;
6α-fluoro-17α-m-chlorobenzoyloxy-21-acetoxy-19-norpregn-4-ene-3,20-dione, and
6α-fluoro-21-m-chlorobenzoyloxy-21-acetoxy-19-norpregn-4-en-17α-ol-3,20-dione;
6β-fluoro-17α-m-chlorobenzoyloxy-21-acetoxypregn-4-ene-3,20-dione, and
6β-fluoro-21-m-chlorobenzoyloxy-21-acetoxy-17α-hydroxypregn-4-en-3,20-dione;
6α,7α-difluoromethylene-17α-m-chlorobenzoyloxy-21-acetoxypregn-4-ene-3,20-dione, and
6α,7α-difluoromethylene-21-m-chlorobenzoyloxy-21-acetoxy-17α-hydropregn-4-ene-3,20-dione;
6α,7α-methylene-17α-m-chlorobenzoyloxy-21-acetoxypregn-4-ene-3,20-dione, and
6α,7α-methylene-21-m-chlorobenzoyloxy-21-acetoxy-17α-hydroxypregn-4-ene-3,20-dione;
6α,7α-difluoromethylene-17α-m-chlorobenzoyloxy-21-acetoxy-19-norpregn-4-ene-3,20-dione, and
6α,7α-difluoromethylene-21-m-chlorobenzoyloxy-21-acetoxy-19-norpregn-4-ene-17α-ol-3,20-dione;
6α,7α-methylene-17α-m-chlorobenzoyloxy-21-acetoxy-19-norpregn-4-ene-3,20-dione, and
6α,7α-methylene-21-m-chlorobenzoyloxy-21-acetoxy-19-norpregn-4-en-17α-ol-3,20-dione;
1α,2α-difluoromethylene-17α-m-chlorobenzoyloxy-21-acetoxypregn-4-ene-3,20-dione, and
1α,2α-difluoromethylene-21-m-chlorobenzoyloxy-21-acetoxy-17α-hydroxypregn-4-ene-3,20-dione;
1α,2α-difluoromethylene-17α-m-chlorobenzoyloxy-21-acetoxy-19-norpregn-4-ene-3,20-dione, and
1α,2α-difluoromethylene-21-m-chlorobenzoyloxy-21-acetoxy-19-norpregn-4-en-17α-ol-3,20-dione;
9α-fluoro-17α-m-chlorobenzoyloxy-21-acetoxypregn-4-ene-3,11,20-trione, and
9α-fluoro-21-acetoxy-21-m-chlorobenzoyloxypregn-4-en-17α-ol-3,11,20-trione;
17α-m-chlorobenzoyloxy-21-acetoxypregn-4-ene-3,11,20-trione, and
21-acetoxy-21-m-chlorobenzoyloxypregn-4-en-17α-ol-3,11,20-trione; and
17α-m-chlorobenzoyloxy-21-acetoxypregn-4-en-11β-ol-3,20-dione, and
21-m-chlorobenzoyloxy-21-acetoxypregn-4-ene-11β,17α-diol-3,20-dione.

Similarly, the corresponding 17α-benzoyloxy-21-acetoxy and 21-acetoxy-21-benzoyloxy-17α-ol compounds are prepared as well as the corresponding 17α,21-diacetoxy and 21,21-diacetoxy-17α-ol compounds.

EXAMPLE 7

A solution of 250 mg. of 3β,21-diacetoxy-17α-m-chlorobenzoyloxy-19-nor-5α-pregnan-20-one in 60 ml. of methanol is treated with 80 mg. of sodium methoxide in 5 ml. of anhydrous methanol, and the mixture is stirred at room temperature under nitrogen atmosphere for 4 hours. It is then poured into ice water and extracted with methylene chloride. The organic extracts are washed with water to neutral, dried over sodium sulfate and evaporated to dryness under reduced pressure. The residue is purified by crystallization from methanol, to yield the pure 3β,17α,21-trihydroxy-19-nor-5α-pregnan-20-one.

The same compound is obtained using 3β,21-dibutyryloxy-17α-m-chlorobenzoyloxy-19-nor-5α-pregnan-20-one.

By the same method, starting from 3β,21-dipropionoxy-17α-m-chlorobenzoyloxy-5α-pregnan-20-one there is produced 3β,17α,21-trihydroxy-5α-pregnan-20-one, identical to that obtained in Example 2.

EXAMPLE 8

By following the method of Example 2 the 17α-m-chlorobenzoyloxy-21-acyloxy-3,20-diketopregn-4-ene derivatives obtained in Example 6 are converted into the corresponding 17α,21-dihydroxy compounds, namely:

17α,21-dihydroxypregn-4-ene-3,20-dione,
17α,21-dihydroxy-19-norpregn-4-ene-3,20-dione,
6α-methyl-17α,21-dihydroxypregn-4-ene-3,20-dione,
6α-methyl-17α,21-dihydroxy-19-norpregn-4-ene-3,20-dione,
6α-chloro-17α,21-dihydroxypregn-4-ene-3,20-dione,
6α-chloro-17α,21-dihydroxy-19-norpregn-4-ene-3,20-dione,
6α-fluoro-17α,21-dihydroxypregn-4-ene-3,20-dione,
6α-fluoro-17α,21-dihydroxy-19-norpregn-4-ene-3,20-dione,
6β-fluoro-17α,21-dihydroxypregn-4-ene-3,20-dione,
6α,7α-difluoromethylene-17α,21-dihydroxypregn-4-ene-3,20-dione,
6α,7α-methylene-17α,21-dihydroxypregn-4-ene-3,20-dione,
6α,7α-difluoromethylene-17α,21-dihydroxy-19-norpregn-4-ene-3,20-dione,
6α,7α-methylene-17α,21-dihydroxy-19-norpregn-4-ene-3,20-dione,
1α,2α-difluoromethylene-17α,21-dihydroxypregn-4-ene-3,20-dione,
1α,2α-difluoromethylene-17α,21-dihydroxy-19-norpregn-4-ene-3,20-dione,
9α-fluoro-17α,21-dihydroxypregn-4-ene-3,11,20-trione,
17α,21-dihydroxypregn-4-ene-3,11,20-trione, and
11β,17α,21-trihydroxypregn-4-ene-3,20-dione.

EXAMPLE 9

Example 5 is repeated using 3β,21-diacetoxy-21-m-chlorobenzoyloxy - 19-nor-5α-pregnan-17α-ol-20-one, 21-acetoxy - 21 - m-chlorobenzoyloxypreg-4-en-17α-ol-3,20-dione, and 6α-methyl-21-acetoxy-21-m-chlorobenzoyloxypregn-4-en-17α-ol-3,20-dione as starting materials in place of 3β,21 - diacetoxy-21-m-chlorobenzoyloxy-5α-pregnan-17α-ol-20-one, obtaining as final products 21-acetoxy-19-nor-5α-pregnan-17α-ol-3,20-dione, 21-acetoxy-preg-4-en-17α-ol-3,20-dione, and 6α-methyl-21-acetoxypregn-4-en-17α-ol-3,20-dione.

Hydrolysis as described in Example 5 affords the corresponding 17α,21-diol-20-one compounds.

EXAMPLE 10

To a solution of 250 mg. of 3β-acetoxy-17-(2'α-acetoxyvinylidene)-5α-androstane in 15 ml. of methylene chloride are added 220 mg. of m-chloroperbenzoic acid, 250 mg. of m-chlorobenzoic acid and 250 mg. of disodium hydrogen phosphate, and the mixture is heated to reflux under stirring for 3 hours, and then allowed to stand at room temperature for 24 hours further. It is then poured into water, extracted with methylene chloride and the combined organic extracts washed to neutrality, dried over sodium sulfate and evaporated to dryness under vacuo. The residue is purified by TLC to yield 3β,21-diacetoxy-17α-m-chlorobenzoyloxy-5α-pregnan-20-one, 3β,21 - diacetoxy - 21-m-chlorobenzoyloxy-17α-hydroxy-5α-pregnan - 20 - one and small amounts of 3β-acetoxy-5α-androstan-17-one and starting material.

EXAMPLE 11

A solution of 1 g. of 6α-fluoro-17-(2'α-acetoxyvinylidene) androst-4-en-11β-ol-3-one in 100 ml. of chloroform is treated with 1.72 g. of m-chloroperbenzoic acid, 1.23 g. of m-chlorobenzoic acid and 1 g. of disodium hydrogen phosphate and is stirred at room temperature for 90 hours. The reaction mixture is then diluted with water, the organic layer is separated and the aqueous phase is extracted several times with chloroform. The combined organic extracts are washed with sodium bicarbonate solution and water to neutral, dried over sodium sulfate and evaporated to dryness under reduced pressure. The residue is purified by TLC using hexane-ethyl acetate (9:1) as eluant, to yield 6α-fluoro-21-acetoxy-17α-m-chlorobenzoyloxypregn-4-en-11β-ol-3,20-dione and 6α - fluoro - 21-acetoxy-21-m-chlorobenzoyloxypregn-4-ene-11β,17α-diol-3,20-dione.

A solution of 300 mg. of 6α-fluoro-21-acetoxy-17α-m-chlorobenzoyloxypregn-4-en-11β-ol-3,20-dione in 60 ml. of methanol is hydrolyzed with potassium bicarbonate solution in accordance with the method of Example 2, to yield 6α-fluoropregn - 4 - ene-11β,17α,21-triol-3,20-dione, identical to an authentic sample of 6α-fluoro-hydrocortisone.

By following the method of Example 5, 200 mg. of 6α-fluoro-21-acetoxy - 21 - m-chlorobenzoyloxypregn-4-ene-11β,17α-diol-3,20-dione are converted into 21-acetoxy-6α-fluoropregn-4-en-17α-ol-3,11,20-trione, identical to an authentic sample of 6α-fluoro cortisone 21-acetate.

EXAMPLE 12

A mixture of 500 mg. of 3β-acetoxy-17-(2'α-acetoxyvinylidene)-5α-androstane, 20 ml. of chloroform, 425 mg. of m-chloroperbenzoic acid and 500 mg. of disodium hydrogen phosphate is maintained at room temperature under stirring for 30 hours. The reaction mixture is diluted with water, the organic layer is separated and the aqueous phase extracted with chloroform. The combined organic extracts are washed to neutrality, dried and evaporated. Purification of the residue by TLC give 3β-acetoxy-5α-androstan-17-one as main product, and small amounts of 3β,21 - diacetoxy-17α-m-chlorobenzoyloxy-5α-prengan-20-one and 3β,21-diacetoxy - 21 - m-chlorobenzoyloxy-5α-pregnan-17α-ol-20-one.

What is claimed is:

1. A process useful for preparing 17α,21-dihydroxy-20-keto steroids of the pregnane series, which comprises reacting a 17-(2'-α-acyloxyvinylidene) steroid selected from those of the following formulas:

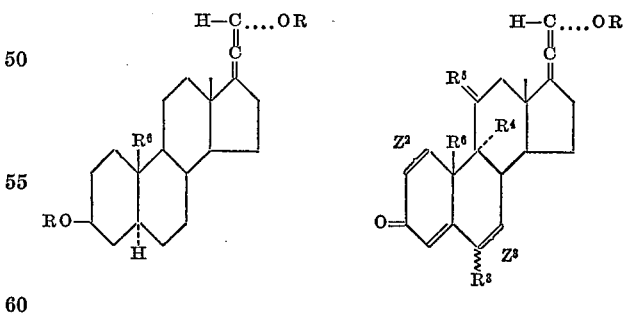

wherein
R represents an acyl radical of up to 4 carbon atoms;
$R^3$ represents hydrogen, chloro, fluoro, bromo or methyl;
$R^4$ represents hydrogen, fluoro, chloro or bromo provided that $R^4$ is chloro when $R^8$ is chloro, and is hydrogen when $R^8$ is hydrogen;
$R^5$ represents oxo or the group

wherein $R^8$ is hydrogen, hydroxy or chloro;
$R^6$ represents hydrogen or methyl;

and each of $Z^2$ and $Z^3$ represents a carbon-carbon single bond or the group $$\overset{\curvearrowright}{\underset{\curvearrowleft}{\diagdown}}CXY$$

in which each of X and Y is hydrogen, fluoro or chloro;
with 2 to molar equivalents of a percarboxylic acid and 2 to 4 molar equivalents of its corresponding carboxylic acid, (a) at a pH of about 7 or greater than 7 to give the corresponding 17α-acyloxy-21-acyloxy-20-keto pregnane and the 17α-hydroxy-21-acyloxy-21-acyloxy-20-keto-pregnane; or (b) at a pH of less than about 7 to give the corresponding 17α-hydroxy - 21 - acyloxy-21-acyloxy-20-keto-pregnane; and (c) converting the compounds thus produced to the corresponding 17α,21-hydroxy-20-keto compounds.

2. The process according to claim 1 wherein the percarboxylic acid is m-chloroperbenzoic acid and its corresponding carboxylic acid is m-chlorobenzoic acid, the products of step (a) being the corresponding 17α-m-chlorobenzoyloxy-21-acyloxy-20-keto-pregnane and the 17α - hydroxy-21-acyloxy-21-m-chlorobenzoyloxy-20-keto-pregnane and the product of step (b) being the corresponding 17α - hydroxy - 21 - acyloxy - 21 - m - chlorobenzoyloxy-20-keto-pregnane.

3. The process according to claim 2 wherein step (a) is conducted and in the presence of an alkaline buffer at a pH of approximately 7, obtaining a mixture of the 17α-m-chlorobenzoyloxy-21-acyloxy-20-keto-pregnane and the 17α - hydroxy - 21 - acyloxy-21-m-chlorobenzoyloxy-20-keto-pregnane derivatives as derivatives as intermediates.

4. The process according to claim 2 wherein step (b) is conducted and in the presence of an acid buffer at a pH of approximately 4, obtaining a 17α-hydroxy-21-acyloxy-21-m-chlorobenzoyloxy-20-keto-pregnane as intermediate.

5. The process according to claim 3 wherein the alkaline buffer is disodium hydrogen phosphate.

6. The process according to claim 4 wherein the acid buffer is monopotassium phthalate.

7. The process according to claim 2 wherein the starting material is a 3β-acyloxy-17-(2'α-acyloxyvinylidene)-5α-androstane or estrane compound.

8. The process according to claim 2 wherein the starting material is a 17-(2'α-acyloxyvinylidene)-Δ⁴-3-keto compound of the formula:

[Structure shown]

wherein
$R^3$ represents hydrogen, chloro, fluoro, bromo or methyl;
$R^4$ represents hydrogen, fluoro, chloro, or bromo, provided that $R^4$ is chloro when $R^8$ is chloro and is hydrogen when $R^8$ is hydrogen;
$R^5$ represents oxo or the group $$R^8\text{---}\overset{H}{\underset{\vdots}{\phantom{-}}}$$

wherein $R^8$ is hydrogen, hydroxy or chloro;
$R^6$ represents hydrogen or methyl and each of $Z^2$ and $Z^3$ represents a carbon-carbon single bond or the group $$\overset{\curvearrowright}{\underset{\curvearrowleft}{\diagdown}}CXY$$

in which each of X and Y is hydrogen, fluoro or chloro.

9. A compound selected from the group of those represented of the following formulas:

[Structures (B) and (C) shown]

wherein
R represents an acyl radical of up to 4 carbon atoms;
$R^1$ is an acyl group derived from a percarboxylic acid;
$R^3$ represents hydrogen, chloro, fluoro, bromo or methyl;
$R^4$ represents hydrogen, fluoro, chloro or bromo provided that $R^4$ is chloro when $R^8$ is chloro, and is hydrogen when $R^8$ is hydrogen;
$R^5$ represents oxo or the group $$R^8\text{---}\overset{H}{\underset{\vdots}{\phantom{-}}}$$

wherein $R^8$ is hydrogen, hydroxy or chloro;
$R^6$ represents hydrogen or methyl;
and each of $Z^2$ and $Z^3$ represents a carbon-carbon single bond of the group $$\overset{\curvearrowright}{\underset{\curvearrowleft}{\diagdown}}CXY$$

in which each of X and Y is hydrogen, fluoro or chloro.

10. A compound according to claim 9 wherein $R^1$ is m-chlorobenzoyl.

11. A compound according to claim 10 Formula B wherein R is acetyl and $R^6$ is methyl, 3β,21-diacetoxy-21-m-chlorobenzoyloxy-5α-pregnan-17α-ol-20-one.

12. A compound according to claim 10 Formula B wherein R is acetyl and $R^6$ is hydrogen, 3β,21-diacetoxy-21-m-chlorobenzoyloxy-19-nor-5α-pregnan-17α-ol-20-one.

13. A compound according to claim 10 Formula C wherein R is acetyl and $R^6$ is methyl.

14. A compound according to claim 10 Formula C wherein R is acetyl and $R^6$ is hydrogen.

15. The compound according to claim 10, 21-acetoxy-21-m-chlorobenzoyloxypregn-4-en-17α-ol-3,20-dione.

16. The compound according to claim 10, 6α-fluoro-21-acetoxy-21-m-chlorobenzoyloxypregn - 4 - en-17α-ol-3,20-dione.

17. The compound according to claim 10, 6α-chloro-21-acetoxy - 21 - m-chlorobenzoyloxypregn-4-en-17α-ol-3,20-dione.

18. The compound according to claim 10, 6α-methyl-21-acetoxy - 21 - m - chlorobenzoyloxypregn-4-en-17α-ol-3,20-dione.

19. The compound according to claim 10, 21-acetoxy-21-m-chlorobenzoyloxypregn-4-en-17α-ol-3,11,20-trione.

20. The compound according to claim 10, 6α-fluoro-21-acetoxy - 21 - m - chlorobenzoyloxypregn-4-ene-11β,17α-diol-3,20-dione.

References Cited
UNITED STATES PATENTS

| | | | |
|---|---|---|---|
| 2,983,735 | 5/1961 | Ruggieri | 260—397.4 |
| 3,117,966 | 1/1964 | Petrow | 260—239.55 |
| 3,681,410 | 8/1972 | Crabbe | 260—397.4 |

ELBERT L. ROBERTS, Primary Examiner

U.S. Cl. X.R.

260—397.47, 239.55, 397.4, 397.5